Figure 1:
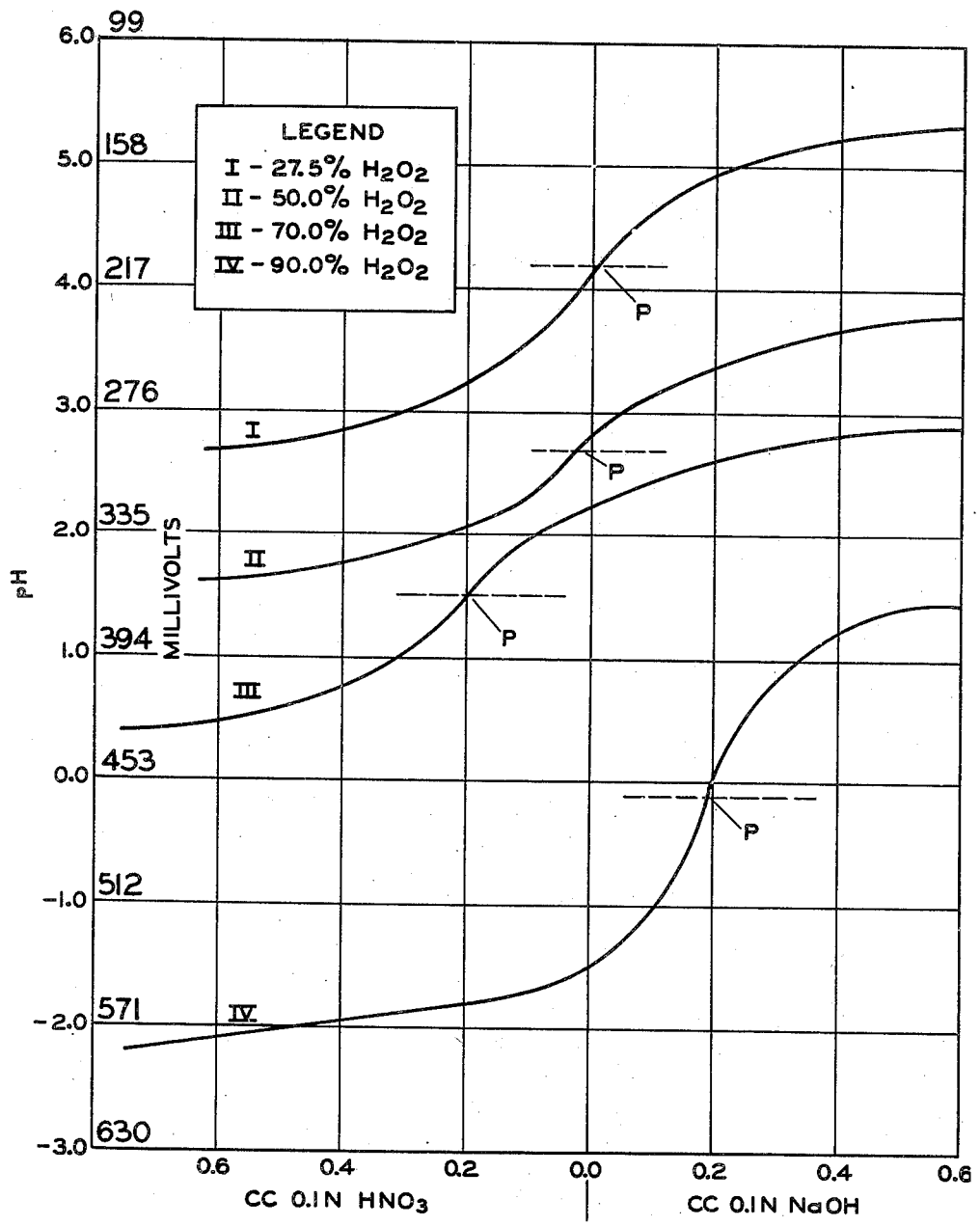

INVENTOR.
ARTHUR A. ELSTON
ATTORNEY

Patented Feb. 14, 1950

2,497,814

UNITED STATES PATENT OFFICE 2,497,814

STABILIZATION OF PEROXIDE SOLUTIONS

Arthur A. Elston, Niagara Falls, N. Y., assignor to E. I. du Pont de Nemours & Company, Wilmington, Del., a corporation of Delaware Application April 17, 1947, Serial No. 742,027

12 Claims. (Cl. 23—207.5)

This invention relates to the stabilization of hydrogen peroxide solutions with soluble tin compounds and particularly to the stabilization of high strength aqueous solutions of hydrogen peroxide containing not more than approximately two moles of water to one mole of hydrogen peroxide.

The development of the art of manufacturing hydrogen peroxide largely has depended upon improvements in stabilizing the product; and the problem of stability has become more difficult as the strength of commercial solutions have increased. Hydrogen peroxide solutions originally marketed on a large scale for bleaching textiles were 25-volume concentration (about 7% by weight of $H_2O_2$). As improvements resulted in greater purity of product and as knowledge of stabilizers increased, it became possible to market still stronger solutions, having increased stability. At present, the standard article of commerce is 100-volume hydrogen peroxide (containing 27.6% by weight of $H_2O_2$), sufficiently stable to permit storage in aluminum containers for long periods of time with practically negligible loss of active oxygen.

It was early discovered that certain tin compounds were excellent stabilizers for hydrogen peroxide solutions. Reichert (U. S. P. 1,958,204) found that 100-volume hydrogen peroxide solutions having excellent stability could be prepared by adding a water-soluble tin compound as stabilizer and maintaining the acidity of the solution at a pH of 4 to 5. Such solutions, stored for months, lose less than 1-volume concentration of peroxide.

Recently the production of unusually high-strength peroxide, from about 50 to 100% by weight concentration has been developed. At such high concentrations, the problems of stability are multiplied; and in order to obtain a product which can be shipped and stored even for relatively short periods of time, the utmost care must be taken to avoid entrance of iron or other catalytic impurities which cause peroxide decomposition. The decomposition of such high-strength peroxide solutions is characterized by a phenomenon akin to autocatalysis. That is, the decomposition generates considerable heat and the resulting elevation in temperature accelerates decomposition. Consequently if decomposition, once started, is permitted to go unchecked, it may reach a stage of explosive violence. This is especially true of concentrations around 70% and higher.

Such high concentrations of hydrogen peroxide, e. g., 70 to 100%, are useful for military purposes, where their utility depends upon exceedingly rapid decomposition when contacted with catalysts, to simultaneously release large quantities of heat and of oxygen. Hence, a high-strength (70 to 100%) product is required, which can be safely stored in storage places or in military devices, substantially without decomposition for relatively long periods of time, and yet will be practically instantaneously decomposed when contacted with suitable decomposition catalysts.

Initial attempts to stabilize such high-strength solutions with stabilizers under conditions useful for the 100-volume product were disappointing, as comparable results could not consistently be obtained. While the best of the conventional peroxide stabilizers, including sodium stannate, had a certain stabilizing effect, that effect usually was less than experienced in stabilizing 100-volume material, even when the preferred methods and conditions of the prior art were followed. Hence, such stabilization attempts did not meet the requirements for satisfactory storage and utilization of the high-strength solutions, and heretofore it has been necessary to depend primarily on maintenance of a high degree of purity to avoid undue decomposition.

One object of this invention is an improved method of stabilizing high-strength hydrogen peroxide solutions of about 50% concentration and higher. Another object is to stabilize such high-strength solutions with soluble tin salts, so as to obtain products possessing stabilities sufficient to meet the most exacting requirements. A further object is to obtain a hydrogen peroxide solution which possesses an increased resistance to decomposition by catalytic impurities introduced by contamination. A still further object is a method of stabilizing hydrogen peroxide with soluble tin compounds in which addition or peptizing agents are not required to maintain the soluble tin salt in an active condition in solution. All these objects and others that will be apparent from the description of the invention given herewith, and are attained by the practice of this invention.

The above objects are attained in accordance with the present invention by adjusting the pH of a hydrogen peroxide solution containing at least about 50% by weight of hydrogen peroxide to a point near its equivalence point as hereinafter described. I have found that the stability of a hydrogen peroxide solution is invariably greatest at or close to its equivalence point and rapidly decreases as the pH is raised or lowered therefrom. The term equivalence point as used herein and in the appended claims means the pH at which the greatest change in pH will occur on the addition of acid or base.

I have also discovered that the effect of a stabilizer for hydrogen peroxide is greatest at or near said equivalence point. Hence, in the preferred mode of practicing the invention, the pH of the solution is adjusted to a point at or near to its equivalence point and stabilizer is added. Preferred stabilizers for this purpose are water-soluble tin compounds. The invention also comprises the novel stabilized high-strength hydrogen peroxide solutions obtained by the foregoing procedures.

Figure 2:
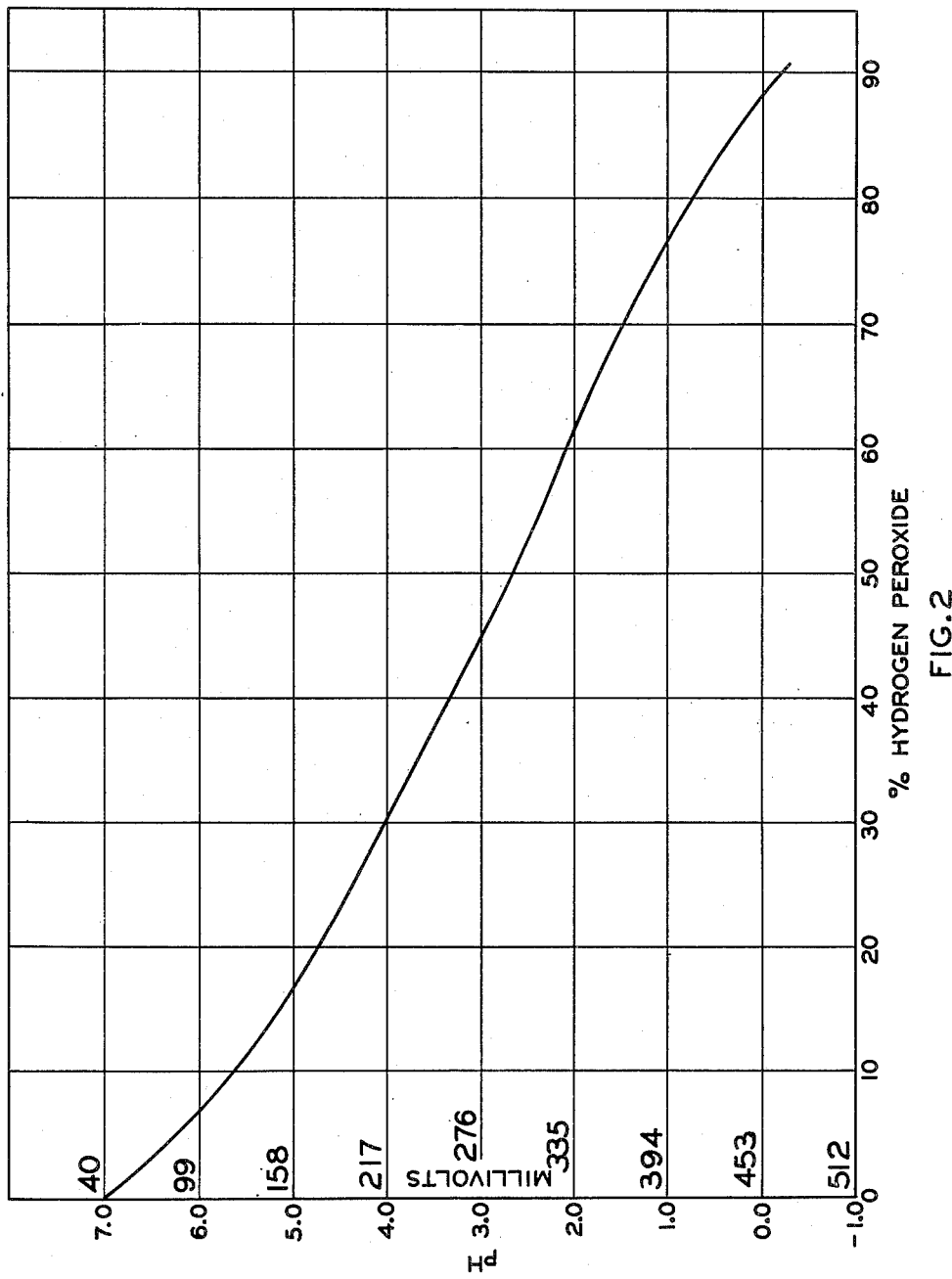
Figure 3:
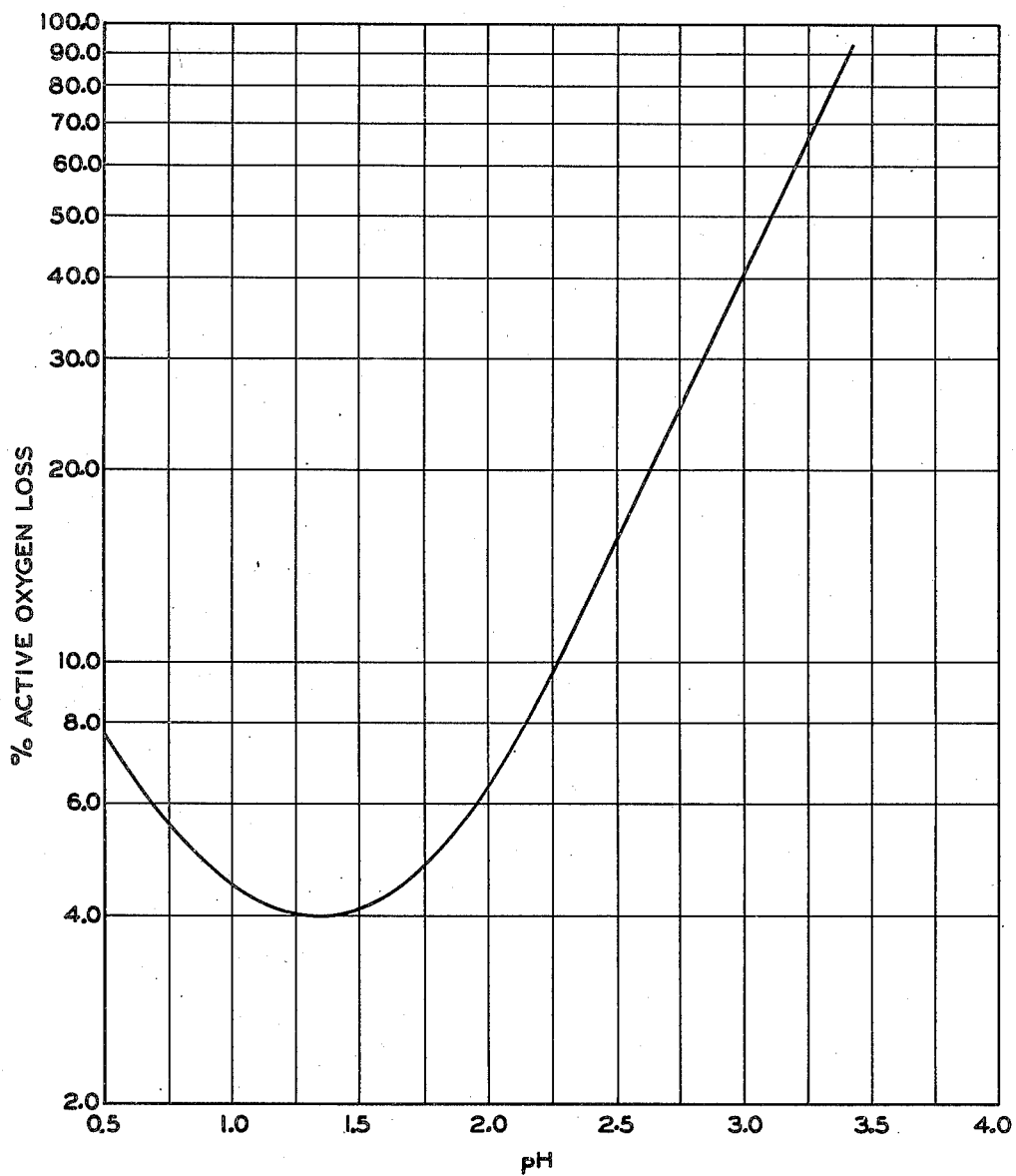

The appended drawings show curves representing experimental data. Fig. 1 is a series of curves made by plotting pH values against amounts of acid and alkali added in electrometric titration of hydrogen peroxide solutions of different strengths. Fig. 2 shows the curve derived by plotting the equivalence points P of Fig. 1 against the concentrations of the solutions. Fig. 3 shows a curve derived by plotting loss of active oxygen from hydrogen peroxide solutions plotted against the pH of said solutions.

The fact that hydrogen peroxide in aqueous solution behaves as a weak acid has long been known. Its ionization constant according to the equation $H_2O_2 \rightleftharpoons H^+ + HO_2^-$ has been determined by various methods and found to be $2 \times 10^{-12}$ as compared to $1 \times 10^{-14}$, the commonly accepted value for the ionization of water into hydrogen and hydroxyl ions. Because of its low ionization constant, however, the direct titration of hydrogen peroxide as an acid, by means of a standard alkaline solution, can not be used as a means of measuring the extent which the hydrogen peroxide exists in its free acid form or in the form of one of its salts.

However, when a pure solution of hydrogen peroxide in water is titrated with a standard alkali and another portion of the peroxide solution is titrated with a standard acid solution and the hydrogen ion concentration (pH) is measured with a glass electrode system after adding each small portion of titrating agent, a smooth curve is obtained by plotting the hydrogen ion concentration in terms of pH against amount of titrating agent as illustrated in Fig. 1 of the drawing. Such a curve resembles that obtained by a similar electrometric titration of pure water. An important point on such a curve is the pH at which the greatest change in pH takes place for an infinitesimal unit amount of alkali or acid added. This inflection point in the case of hydrogen peroxide solution is the point where the only sources of hydrogen ions are the water and the hydrogen peroxide, and in the case of pure water where the hydrogen ions are derived only from the water itself. For the purpose of this description, this inflection point is termed the "equivalence point." The equivalence points for hydrogen peroxide solutions of four different concentrations are shown in Fig. 1 by the dotted lines at P. The experimental results show that the "equivalence points" for the four solutions tested in developing the curves of Fig. 1 have the following pH values:

| Solution | $H_2O_2$ Concentration | Equivalence point |
|---|---|---|
| | Per cent by weight | |
| I | 27.5 | 4.2 |
| II | 50 | 2.7 |
| III | 70 | 1.5 |
| IV | 90 | −0.1 |

The presence of small amounts of acidic or alkaline substances, which may be present in commercial hydrogen peroxide displaces the curve only along the axis designating the amount of the acid or alkali titrating agent used, and the "equivalence point" is not shifted to any appreciable extent along the pH axis. The "equivalence point" in the titration of aqueous hydrogen peroxide solutions with acid and alkali, as described above, has been found to change in position along the pH axis in a regular manner depending only on the concentration of the hydrogen peroxide. The titration curves for 27.6%, 50%, 70% and 90% hydrogen peroxide solutions are illustrated in Fig. 1 as typical curves.

It should be noted here that when concentrations of hydrogen peroxide greater than 85% by weight are titrated the "equivalence point" falls outside of the usual pH range and negative pH values are encountered. In these circumstances, the pH, which is commonly determined with a glass electrode system in the case of hydrogen peroxide solutions, is measured in terms of electrical potential (millivolts) developed by the electrode system and the apparent pH in the negative pH range is obtained by extrapolation of the pH values against electrical potential. The extension of the usual pH terminology into a negative pH range is not unusual and has been made use of in several instances in the literature.

When the equivalence point values of hydrogen peroxide solutions of various concentrations are plotted against hydrogen peroxide concentration a smooth curve is obtained as illustrated in Fig. 2.

I have found that when the stabilities of a high-strength aqueous hydrogen peroxide solution are determined at various pH values and when the losses are plotted against the pH value for any concentration, a more or less U or J shaped curve is obtained, as shown in Fig. 3. The data for plotting the curve in Fig. 3 were obtained by subjecting four samples of a 70% by weight unstabilized hydrogen peroxide, in covered glass flasks to a temperature of 100° C. for 15 hours, these samples having been adjusted to pH of 0.5, 0.7, 1.5 and 2.5, respectively, and analyzing each sample for active oxygen before and after the test. The loss in active oxygen content was plotted against pH, resulting in the curve of Fig. 3.

Other hydrogen peroxide solutions containing 50% by weight and more of hydrogen peroxide subjected to the same test give similar data, and the minimum loss in hydrogen peroxide for each concentration is invariably found to occur at or about the equivalence point. As the pH of the solution is increased above the equivalence point, the losses increase more and more rapidly; and as the pH is decreased below the equivalence point the losses likewise increase, but more gradually.

I have also found that the addition of stabilizers to the hydrogen peroxide solutions does not substantially change the pH at which the minimum losses (maximum stability) of hydrogen peroxide occurs, i. e., maximum stability is obtained at the equivalence point. The losses of hydrogen peroxide obtained in the presence of stabilizer, however, are at least equal to and usually lower than without the stabilizer, depending on the amount and nature of the catalytic impurities present in the hydrogen peroxide and the amount and effectiveness of the stabilizer.

Therefore, in order to produce a high-strength hydrogen peroxide solution of maximum stability, I determine its equivalence point and adjust the pH of the solution to a point near the equivalence point. If the stability is to be improved by addition of a stabilizing agent, I have found that the greatest stabilizing effect is obtained if the pH of the stabilized product is maintained at or near said equivalence point.

I have found that soluble tin salts, and particularly sodium stannate, are remarkably effective as stabilizers for hydrogen peroxide solutions at or near the equivalence point of the solution and that the stabilizing effect of the tin salts is much greater at or near the equivalence point than at higher or lower pH values. Under these conditions sodium stannate, for example, was found to have a markedly high deactivating effect on the catalytic impurities commonly present in hydrogen peroxide or which are likely to be introduced into the hydrogen peroxide by contamination. The amount of sodium stannate required to effectively stabilize the peroxide solution may be varied considerably; 36 to 288 milligrams of sodium stannate trihydrate ($Na_2SnO_3 \cdot 3H_2O$) has been found sufficient to insure deactivation of the catalytic impurities usually present in hydrogen peroxide and in addition to satisfactorily provide for impurities introduced by contamination. Less than 36 milligrams of stannate has a stabilizing action, but whether it gives complete stabilization, of course, depends on the amount of impurities present. Obviously a hydrogen peroxide solution absolutely free from any trace of catalytic impurities would not require a stabilizer, except to deactivate impurities introduced by accidental contamination. The production of hydrogen peroxide solution free from catalytic impurities is extremely difficult and generally is practically impossible. The maintenance of hydrogen peroxide free from accidental contamination is equally difficult in large scale operations.

The stability of a high-strength hydrogen peroxide containing around 288 milligrams per liter of sodium stannate is slightly less than that of a solution of the same strength and purity containing around 40 to 80 milligrams per liter of the stannate. This is probably due to the possibility that tin compounds have a very slight adverse catalytic effect, probably less than any other catalytic agent, which becomes more or less apparent when large concentrations come into consideration. The similar effect of concentration on the catalytic effectiveness of other substances has been observed with hydrogen peroxide.

While I may use up to 288 milligrams per liter of sodium stannate trihydrate, or even more, in the stabilization of high-strength hydrogen peroxide solutions by my improved method, I prefer to use in the order of 70 milligrams of the stannate trihydrate per liter, e. g., 40 to 80 milligrams per liter, as I have found this amount adequate to give the optimum stability, in the presence of the amount of catalytic impurities usually present in the commercial product and to provide adequate protection against accidental contamination and yet not materially reduce the overall purity of the product. Other soluble tin compounds, likewise useful for practicing the invention, may be used in amounts stoichiometrically equivalent to the above stated amounts of sodium stannate trihydrate.

The stabilization of the hydrogen peroxide solutions with sodium stannate at the equivalence point presents practical difficulties. Hydrogen peroxide solutions at their equivalence point values are very sensitive to changes in pH by accidental introduction of acid or alkaline substances. Such impurities may be introduced by absorption from the air, contamination by dust particles, and absorption of alkali- or acid-consuming substances from the container. The shift of the pH of the peroxide solution by contamination to a higher pH is less to be desired than a corresponding shift to a lower pH, since, as previously pointed out, the decrease in stability with unit change in pH is greater as the pH is increased above the equivalence point than when the pH is lowered. For this reason, I prefer to stabilize the hydrogen peroxide with sodium stannate at a pH somewhat below the equivalence point. In general, no markedly adverse effect will be obtained in lowering the pH by 1–2 pH units below the equivalence point; however, I prefer not to lower the pH more than 0.5 unit, say 0.3–0.4 unit, below the equivalence point. For best results, the pH should not be more than 1 pH unit above the equivalence point and preferably not more than about 0.2 unit thereabove.

The amount of lowering of the pH below the equivalence point is limited by several conditions. One, for example, is that relatively large amounts of acidifying agent are required which reduce the purity of the product. In addition I have found indications that aluminum, which is the commonly used material of construction for hydrogen peroxide containers, is dissolved or corroded the least when the solution is at or near its equivalence point.

Heretofore, the use of a peptizing agent in conjunction with sodium stannate as stabilizer has been a practical necessity to insure that the tin is maintained in a soluble state or in solution during varied conditions of storage. For example, while hydrogen peroxide can be successfully stabilized with sodium stannate without the use of a peptizing agent, under many conditions occurring in commercial practice, the addition of a peptizing agent is required to maintain the stannate in solution and to obtain the maximum stabilizing effect. I have found, surprisingly, that in the practice of the herein described invention the use of a peptizing agent for the sodium stannate generally is of little or no advantage in increasing the stability of the product, the permanence of the stabilizing action of the sodium stannate, or resistance of the product to decomposition by accidentally introduced catalytic impurities. This is particularly true of the higher concentrations, e. g., the 70–100% hydrogen peroxides. Also, the presence of phosphates or pyrophosphates in 70 to 100% hydrogen peroxide often has an undesirable effect in that it causes precipitation of the stabilizer in the presence of aluminum. In addition there are indications that the phosphates increase the rate of solution of metallic aluminum in the high-strength hydrogen peroxides. These effects, of course, give the product an undesirable appearance, and lead to the presence of undesirable substances in the product. In stabilizing hydrogen peroxide of 50 to 60% concentrations, however, the peptizing agents tend to have some effectiveness in preventing precipitation of the tin compounds. Hence, it is sometimes desirable to use a peptizing agent in these lower concentration peroxides, especially when relatively large amounts of tin compound are utilized.

My improved process of stabilizing gives markedly improved stabilities with 50% and more highly concentrated solutions of hydrogen peroxide, that is, where the solution contains not more than 2 moles of water to one mole of hydrogen peroxide. In stabilizing different concentrations of hydrogen peroxide by my method, the pH at which the solution is to be stabilized is dependent only upon the concentration of the peroxide. This pH, as pointed out previously, is readily determined by titration with alkali and acid, and when once determined for any concentration is a fixed property of that concentration of hydrogen peroxide. In addition, the pH for the stabilization of intermediate and other concentrations of hydrogen can be readily interpolated or extrapolated from the results of equivalence point determinations on a few concentrations. Thus, the equivalence point for any high-strength peroxide solution can be determined from the data shown graphically in Fig. 2.

*Example 1*

The equivalence point of 70% by weight hydrogen peroxide solution, by electrometric titration of distilled product with standard acid and alkali solution, was found to be pH 1.5. Two series of samples from the same lot of 70% hydrogen peroxide were prepared and tested for stability in the following manner.

The first series of samples was prepared by taking several portions of the 70% hydrogen peroxide and adjusting the pH of each portion to a desired value in the pH range of 0.5 to 3.4, with concentrated C. P. nitric acid solution or a concentrated solution of C. P. sodium hydroxide in distilled water, as the case required. The adjustments and final pH determination are preferably made with the aid of a glass electrode pH meter.

The second series of samples was prepared by adding to a quantity of the 70% hydrogen peroxide a sufficient amount, e. g., 1 cc., of filtered solution containing a known quantity, e. g., 7.2 g./100 cc., of sodium stannate trihydrate in distilled water to give a concentration of 0.072 g. per liter of the tin salt in the hydrogen peroxide solution. The resulting peroxide solution containing tin was then divided into several portions and the pH of each portion was adjusted to a desired value in the range of pH 1.0–5.0 in the manner indicated for the first series.

Approximately 100 cc. samples of portions at different pH values in each series were stored in a water bath at 100° C. for 15 hours. The samples were analyzed for hydrogen peroxide content before and after the test. The samples were contained in glass flasks, designed to prevent contamination of the sample by atmospheric dust particles and evaporation of the sample. The percentage of the original amount of hydrogen peroxide lost by decomposition in the test was calculated from the initial and final weights and the hydrogen peroxide contents of the samples.

The hydrogen peroxide losses for the various samples are tabulated below against pH:

| pH | Hydrogen peroxide losses, per cent by wt. | |
|---|---|---|
| | Series I No stabilizer added | Series II Containing 0.072 g. $Na_2SnO_3.3H_2O$ per liter of $H_2O_2$ soln. |
| 0.5 | 7.5 | |
| 0.7 | 7.0 | |
| 1.0 | | 0.5 |
| 1.5 | 4.0 | |
| 1.6 | | 0.3 |
| 2.5 | 21.7 | |
| 3.2 | | 1.9 |
| 3.4 | 91.0 | |
| 4.7 | | 76.1 |

No evidence of precipitation of the stabilizers was apparent in these tests.

These results show the rapid increase in hydrogen peroxide losses as the pH is increased above pH 1.5–1.6 and the lesser tendency for losses to increase as the pH is decreased below pH 1.5–1.6. They also show that the minimum losses (maximum stability) of the 70% hydrogen peroxide is obtained at about pH 1.5, which is the equivalence point of the solution. This data also demonstrates the remarkable stabilizing action of the tin salt at the equivalence point, reducing the losses to but $1/13$ that of the unstabilized material.

*Example 2*

The equivalence point of double-distilled, 90% by weight hydrogen peroxide, determined by titration as in Example 1, was found to be pH −0.1. Two series of samples of the same lot of double-distilled 90% hydrogen peroxide, the first containing no sodium stannate and the second containing 0.072 g. of sodium stannate trihydrate per liter, were prepared as in Example 1. However, the pH range in which the samples were adjusted in this case was −1.5 to +2.3. The pH values in the negative range were obtained by determining the electrical potential developed by the glass electrode system, and the pH values were read from a curve prepared by plotting pH against potential, as given in the literature (cf. Langes Handbook of Chemistry, 5th ed., Handbook Publishers, Sandusky, Ohio, 1944, page 1098 et. seq.) and extrapolation into the negative pH range.

The percentage hydrogen peroxide losses in storing the samples at 100° C. for 15 hours as described in Example 1, are tabulated below against the pH of the samples:

| pH | Hydrogen peroxide losses, percent by wt. | |
|---|---|---|
| | Series I No stabilizer added | Series II 0.072 g. $Na_2SnO_3.3H_2O$ per liter |
| −1.4 | | 1.0 |
| −1.0 | 1.2 | |
| −0.5 | 0.8 | 0.5 |
| 0.0 | 1.1 | 0.5 |
| +0.5 | | 0.6 |
| +1.0 | 2.9 | 0.8 |
| +2.0 | | 2.0 |
| +2.3 | 4.2 | |

The above results are in accord with those of Example 1 with 70% hydrogen peroxide, the maximum stability being obtained at the equivalence point. The improvement in stability by stabilization with sodium stannate, is smaller on a numerical basis than in Example 1, because the double distillation of the product reduced the catalytic impurities.

*Example 3*

The equivalence point of 95% double distilled hydrogen peroxide, determined by the method of Example 1, was found to be pH −0.8. Stability tests at 100° C. for 15 hours on the 95% hydrogen peroxide with and without 0.072 g. sodium stannate trihydrate per liter, utilizing the procedure of Example 1, over the pH range −2.5 to +1.0, gave the losses as tabulated below against pH:

| pH | Percent by wt., hydrogen peroxide losses | |
| --- | --- | --- |
| | Series I without sodium stannate | Series II with 0.072 g. sodium stannate trihydrate per liter |
| −2.1 to −2.2 | 0.6 | 0.0 |
| −1.4 | 0.5 | 0.1 |
| −0.8 | 0.9 | (Slight gain) |
| −0.1 to −0.2 | 0.3 | 0.1 |
| +0.4 to +0.5 | 1.5 | 0.2 |
| +1.0 | 1.1 | 0.8 |

In the cases of the unstabilized sample at pH −0.8, an unexpected high loss was obtained, which was undoubtedly caused by accidental contamination with a minute amount of catalytic impurity and incidentally indicates the sensitivity of unstabilized peroxide to decomposition by catalytic impurities. On the other hand, the use of sodium stannate as stabilizer at or below the equivalence point reduced the composition to a negligible amount.

*Example 4*

A stability test on distilled 50% hydrogen peroxide, which has a equivalence point of 2.7, stabilized with 0.045 g. per liter of sodium stannate trihydrate and 0.065 g. disodium phosphate ($Na_2HPO_4.12H_2O$) per liter at pH 4.5, showed a loss of 3.1% hydrogen peroxide in 15 hours at 100° C. A similar test on 50% hydrogen peroxide from the same lot stabilized at a pH slightly below the equivalence point, i. e., at pH 2.5, with 0.072 g. per liter of sodium stannate trihydrate alone showed a loss of only 0.3% hydrogen peroxide.

*Example 5*

Two series of samples of double-distilled 90% hydrogen peroxide were prepared stabilized at pH 0.0 (determined by the method described in Example 2) with 0.072 g. sodium stannate trihydrate per liter for the first series and with 0.125 g. disodium phosphate ($Na_2HPO_4.12H_2O$) for the second series. Each lot was divided into five portions, and a known amount of iron, in the form of the ferrous ammonium sulfate was added as a catalytic contaminating material. The hydrogen peroxide losses for the samples at 100° C. for 15 hours are tabulated below against the amount of iron:

| g. per liter iron added | Percent Hydrogen peroxide losses | |
| --- | --- | --- |
| | Series I 0.072 g. $Na_2SnO_3.3H_2O$ per liter | Series II 0.125 g. $Na_2HPO_4.12H_2O$ per liter |
| none | 0.2 | 0.3 |
| 0.00001 | 0.2 | 1.4 |
| 0.00010 | 0.3 | 1.4 |
| 0.00100 | 0.3 | 5.2 |
| 0.00500 | 15.6 | 58.8 |

Similar results are obtained with 50 and 70% hydrogen peroxide solutions.

*Example 6*

Samples of 70% hydrogen peroxide were subjected to the 100° C. stability test for 15 hours as indicated for those given in Series II of Example 1, except that in addition to the 0.072 g. sodium stannate trihydrate per liter used as stabilizer, 0.125 g. of disodium phosphate ($Na_2HPO_4.12H_2O$) per liter was added. The hydrogen peroxide losses in relationship to pH were as follows:

| pH | Percent Hydrogen peroxide Loss |
| --- | --- |
| 0.7 | 0.2 |
| 1.4 | 0.4 |
| 1.5 | 0.2 |
| 2.5 | 0.4 |
| 3.4 | 1.9 |
| 4.0 | 9.8 |

Comparison of these results with those of Example 1, shows that the presence of the phosphate does not appreciably increase the stability of the products.

*Example 7*

Solutions of 70% hydrogen peroxide containing 0.36, 0.144 and 0.288 g. of sodium stannate trihydrate per liter and adjusted to the equivalence point were subjected to the 100° C. stability test for 15 hours and the hydrogen peroxide losses found were 0.4, 0.1 and 0.3% respectively.

While I prefer to use sodium stannate trihydrate as my stabilizing agent, because it introduces a minimum of ions other than tin, other water-soluble salts or inorganic compounds of tin may be used. As alternatives to sodium stannate I prefer to use stannate of potassium, lithium or other alkali metals. Salts of tin in which the tin is in the positive state, such as fluorides, chloride, oxychlorides and sulfate may be used in those cases where the presence of corresponding negative ions in the peroxide solutions are not objectionable for specific purposes.

This stabilizing procedure may be combined with other treatments of the hydrogen peroxide, for example, the use of nitrates as corrosion inhibitors as described in U. S. P. 2,008,726. It also may be used following conventional purification treatments, such as distillation, filtration and precipitation treatments.

The herein described invention provides a means for maintaining high-strength hydrogen peroxide solutions at maximum stability, so that they may be stored and shipped, for instance in aluminum containers, without substantial decomposition. The solutions are stabilized against accidental contamination with adversely catalytic impurities to a high degree. The stabilized product needs contain only small amounts of stabilizer and hence it inherently has a high degree of purity. The product may be adapted for storage in aluminum containers without substantial attack on the aluminum and hence without contamination by aluminum compounds. The invention is especially useful for stabilizing high-strength peroxide solutions containing about 70 to 100% by weight of hydrogen peroxide.

I claim:

1. In the manufacture and storage of a high-strength hydrogen peroxide solution containing not less than about 50% by weight of hydrogen peroxide, the improvement which comprises adjusting and maintaining the pH of said solution not more than 1 pH unit above, nor more than 2 pH units below, the pH at which the greatest change in pH will occur on the addition of a substance from the group consisting of acid and base and adding thereto a hydrogen peroxide stabilizer.

2. In the manufacture and storage of a high-strength hydrogen peroxide solution containing not less than about 50% by weight of hydrogen peroxide, the improvement which comprises adjusting and maintaining the pH of said solution near the pH at which the greatest change in pH will occur on the addition of a substance from the group consisting of acid and base and adding thereto a hydrogen peroxide stabilizer.

3. In the manufacture and storage of a high-strength hydrogen peroxide solution containing not less than about 50% by weight of hydrogen peroxide, the improvement which comprises adjusting and maintaining the pH of said solution near the pH at which the greatest change in pH will occur on the addition of a substance from the group consisting of acid and base and adding to said solution a small amount of a water soluble tin compound.

4. In the manufacture and storage of a high-strength hydrogen peroxide solution containing not less than about 50% by weight of hydrogen peroxide, the improvement which comprises adjusting and maintaining the pH of said solution not more than 1 pH unit above, nor more than 2 pH units below, the pH at which the greatest change in pH will occur on the addition of a substance from the group consisting of acid and base and adding to said solution an amount of alkali metal stannate stoichiometrically equivalent to about 36 to 288 milligrams per liter of sodium stannate trihydrate.

5. The process for stabilizing a hydrogen peroxide solution containing upwards of 50% by weight of hydrogen peroxide which comprises electrometrically titrating said solution with acid and alkali to determine the pH at which the greatest change in pH will occur on the addition of a substance from the group consisting of acid and base adjusting the pH of said solution to a point near the pH at which the greatest change in pH will occur on the addition of a substance from the group consisting of acid and base and adding a small amount of a soluble tin compound.

6. A process according to claim 5, in which the pH is adjusted to a value not more than 1 pH unit above, nor more than 2 pH units below, the pH at which the greatest change in pH will occur on the addition of a substance from the group consisting of acid and base and the soluble tin compound is alkali metal stannate added in a concentration stoichiometrically equivalent to about 36 to 288 milligrams per liter of sodium stannate trihydrate.

7. A process according to claim 5 in which the pH is adjusted to a value not more than about 0.5 pH unit below and not higher than the pH at which the greatest change in pH will occur on the addition of a substance from the group consisting of acid and base and the tin compound is sodium stannate added in a concentration stoichiometrically equivalent to about 40 to 80 milligrams per liter of sodium stannate trihydrate.

8. A high-strength hydrogen peroxide product containing not less than about 50% by weight of hydrogen peroxide, the pH value of which is near the pH at which the greatest change in pH will occur on the addition of a substance from the group consisting of acid and base and which contains a hydrogen peroxide stabilizer.

9. A high-strength hydrogen peroxide product containing not less than about 50% by weight of hydrogen peroxide and a pH value not more than 1 pH unit above, nor more than 2 pH units below the pH at which the greatest change in pH will occur on the addition of a substance from the group consisting of acid and base and containing a small amount of a soluble tin compound.

10. The product of claim 9 having a pH value within the range of from 0.5 pH unit below, up to the pH at which the greatest change in pH will occur on the addition of a substance from the group consisting of acid and base and containing an alkali metal stannate in concentration stoichiometrically equivalent to about 36 to 288 milligrams per liter of sodium stannate trihydrate.

11. The product of claim 10, containing about 70 to 100% by weight of hydrogen peroxide.

12. The product of claim 11, which contains sodium stannate in concentration stoichiometrically equivalent to about 40 to 80 milligrams per liter of sodium stannate trihydrate.

ARTHUR A. ELSTON.

REFERENCES CITED

The following references are of record in the file of this patent:

"A Treatise on Physical Chemistry," by Taylor, vol. II, D. Van Nostrand Co., Inc., New York (1931), pp. 923–25. (Copy Division 59).